(12) United States Patent
Sun et al.

(10) Patent No.: US 8,300,592 B2
(45) Date of Patent: Oct. 30, 2012

(54) SIGNAL TRANSMISSION METHOD AND DEVICE

(75) Inventors: Shaohui Sun, Beijing (CN); Yingmin Wang, Beijing (CN); Hai Tang, Beijing (CN); Yuemin Cai, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 284 days.

(21) Appl. No.: 12/682,444

(22) PCT Filed: Oct. 7, 2008

(86) PCT No.: PCT/CN2008/072610
§ 371 (c)(1),
(2), (4) Date: Apr. 9, 2010

(87) PCT Pub. No.: WO2009/049528
PCT Pub. Date: Apr. 23, 2009

(65) Prior Publication Data
US 2010/0254341 A1 Oct. 7, 2010

(30) Foreign Application Priority Data

Oct. 11, 2007 (CN) .......................... 2007 1 0175758

(51) Int. Cl.
*H04W 72/04* (2009.01)
(52) U.S. Cl. ........ 370/330; 370/342; 370/335; 370/320; 370/329; 375/148; 375/340; 375/260
(58) Field of Classification Search .................. 370/330, 370/342, 208, 335, 320, 329; 375/148, 152, 375/260, 340, 130, 267
See application file for complete search history.

(56) References Cited

U.S. PATENT DOCUMENTS

| | | | |
|---|---|---|---|
| 2003/0067961 | A1 | 4/2003 | Hudson et al. |
| 2003/0086371 | A1* | 5/2003 | Walton et al. .................. 370/235 |
| 2004/0125861 | A1* | 7/2004 | Chang ........................... 375/146 |
| 2005/0135324 | A1* | 6/2005 | Kim et al. ...................... 370/343 |
| 2006/0133522 | A1* | 6/2006 | Sutivong et al. ............... 375/260 |
| 2006/0245472 | A1* | 11/2006 | Pan et al. ....................... 375/144 |
| 2006/0274829 | A1* | 12/2006 | Siemens et al. .......... 375/240.01 |
| 2008/0049851 | A1* | 2/2008 | Nangia et al. ................. 375/260 |

FOREIGN PATENT DOCUMENTS

| | | |
|---|---|---|
| CN | 1496609 | 5/2004 |
| CN | 1507706 | 6/2004 |
| CN | 1571414 A | 1/2005 |
| CN | 1719817 | 1/2006 |
| CN | 1747462 A | 3/2006 |
| CN | 1756248 | 4/2006 |
| CN | 1992701 A | 7/2007 |
| KR | 2005006063 | 6/2005 |
| KR | 10-2010-7009791 | 7/2011 |
| WO | WO 2006/134991 | 12/2006 |

* cited by examiner

*Primary Examiner* — Ricky Ngo
*Assistant Examiner* — Rasheed Gidado
(74) *Attorney, Agent, or Firm* — Workman Nydegger

(57) ABSTRACT

A signal transmission method, which includes: each data symbol needing to be transmitted is weighted and repeatedly extended to obtain the extended data symbol of each data symbol; the extended data symbol of each data symbol and the pilot frequency symbol are modulated and mapped to the specified time-frequency locations of each corresponding block repeat resource block to obtain each corresponding repeat data unit block; each repeat data unit block is transmitted. A signal transmission device is also disclosed in the present invention.

13 Claims, 6 Drawing Sheets

SIGNAL TRANSMISSION METHOD AND DEVICE

This application claims priority to Chinese Patent Application No. 200710175758.9, filed with the Chinese Patent Office on Oct. 11, 2007 and entitled "SIGNAL TRANSMISSION METHOD AND SIGNAL TRANSMISSION DEVICE", which is hereby incorporated by reference in its entirety.

FIELD OF THE INVENTION

The present invention relates to the field of Orthogonal Frequency Division Multiplexing (OFDM) radio mobile communications and in particular to a signal transmission method and device.

BACKGROUND OF THE INVENTION

OFDM will be widely applied in future communication systems as a basic technique for air interfaces of the systems.

A process of transmitting a signal through OFDM involves:
  a. Data to be transmitted is modulated and segmented into a block of data symbols; and
  b. the block of generated data symbols and a pilot symbol (a common or Dedicated pilot symbol) are modulated and mapped into specified time-frequency locations of a Physical Resource Block (PRB) to obtain a Data Block (DB) corresponding to the data to be transmitted; and
  c. The data block is transmitted.

For transmission of the signal through OFDM, a channel resource is a two dimensional structures of time-frequency and can be divided into one or more PRBs. FIG. 1 is a schematic diagram of a PRB which occupies a part of the channel resource. The PRB includes $N_T$ consecutive OFDM symbols in the time domain and $N_F$ consecutive orthogonal sub-carriers in the frequency domain. The PRB totally includes $N_T \times N_F$ time-frequency locations.

As can be apparent, data of different users can be transmitted over different orthogonal sub-carriers in an OFDM symbol during transmission of the signal through OFDM to thereby achieve multiplexing and multiple-access of users.

For an OFDM system, there is no multiple access interference in a cell. However in a same frequency network, users of neighbor cells may cause interference to each other if signals are transmitted at the same time-frequency locations. Especially if a user at the edge of a cell is closer to another neighbor cell, then an interference signal from another user in the neighbor cell may be strong so that the user at the edge of the cell may suffer from a degraded quality of communication.

SUMMARY OF THE INVENTION

In view of this, a technical problem solved by the invention is to provide a signal transmission method and device to reduce interference between users of neighbor cells in a same frequency network using an OFDM technique and thus improve communication quality of a user at the edge of a cell.

In order to attain this object, technical solutions of the invention are as follows:

A signal transmission method includes:
  weighting and repeatedly spreading respective data symbols to be transmitted to obtain spread data symbols of the respective data symbols;
  modulating and mapping the spread data symbols of the respective data symbols and a pilot symbol into specified time-frequency locations in respective corresponding Block Repeat resource Blocks, BRBs, to obtain respective corresponding repeat data element blocks; and
  transmitting the respective repeat data element blocks, Preferably, the data symbols to be transmitted are weighted and repeatedly spread by a Repeat Factor RF.

In some embodiments, the data symbols are repeated by the RF, and an available weight factor sequence is selected from a group of weight factor sequences corresponding to the RF; and the respective data symbols obtained by repeating are multiplied by respective weight factors in the selected weight factor sequence to weight and repeatedly spread the data symbols.

In some embodiments, the pilot symbol is a spread dedicated pilot symbol.

In some embodiments, the dedicated pilot symbol is weighted and repeatedly spread by the respective weight factors in the weight factor sequence to obtain respective spread dedicated pilot symbols.

Preferably, the dedicated pilot symbol is repeated by the RF; and the respective dedicated pilot symbols obtained by repeating are multiplied by the respective weight factors in the weight factor sequence to weight and repeatedly spread the dedicated pilot symbol.

In some embodiments, the method further includes: comparing the respective spread dedicated pilot symbols in the respective repeat data element blocks with the un-weighted dedicated pilot symbol, by a receiving terminal, upon reception of the respective repeat data element blocks; and performing an inverse operation to derive the weight factor sequence for weighting and repeatedly spreading the dedicated pilot symbol.

In some embodiments, the pilot symbol is a common pilot symbol.

In some embodiments, pilot symbols of users of neighbor cells are modulated and mapped into non-overlapping time-frequency resource locations in BRBs.

In some embodiments, sequences used by pilot symbols of users of neighbor cells are orthogonal each other.

In some embodiments, pilot symbols transmitted over different antennas are modulated and mapped into non-overlapping time-frequency resource locations in BRBs.

In some embodiments, sequences used by pilot symbols transmitted over different antennas are orthogonal each other.

The invention further provides a corresponding signal transmission device including:
  a data symbol spreading unit adapted to weight and repeatedly spread respective data symbols to be transmitted to obtain spread data symbols of the respective data symbols;
  a repeat data element block unit adapted to modulate and map the spread data symbols, which are obtained by the data symbol spreading unit, and a pilot symbol into specified time-frequency locations in respective corresponding Block Repeat resource Blocks, BRBs, to obtain respective corresponding repeat data element blocks; and
  a transmission unit adapted to transmit the respective repeat data element blocks obtained by the repeat data element block unit.

Preferably, the data symbol spreading unit weights and repeatedly spreads the data symbols to be transmitted by a Repeat Factor, RF.

In some embodiments, the data symbol spreading unit includes: a module adapted to repeat the data symbols by the RF and to select an available weight factor sequence from a group of weight factor sequences corresponding to the RF;

and a module adapted to multiply the respective data symbols obtained by repeating by respective weight factors in the selected weight factor sequence to weight and repeatedly spread the data symbols.

In some embodiments, the pilot symbol is a spread dedicated pilot symbol.

In some embodiments, the device further includes: a pilot symbol spreading unit adapted to weight and repeatedly spread the dedicated pilot symbol using the respective weight factors in the weight factor sequence to obtain respective spread dedicated pilot symbols.

Preferably, the pilot symbol spreading unit includes: a module adapted to repeat the dedicated pilot symbol by the RF; and a module adapted to multiply the respective dedicated pilot symbols obtained by repeating by the respective weight factors in the weight factor sequence to weight and repeatedly spread the dedicated pilot symbol.

In some embodiments, the pilot symbol is a common pilot symbol.

In the invention, data of different users occupying the same time-frequency locations can be weighted and repeatedly spread by using different weight factor sequences to obtain different repeat data element blocks. In a same frequency network, if a user at the edge of a cell receives a signal transmitted from a user of an neighbor cell, the respective repeat data element block occupying the same time-frequency locations can be separated by the different weight factor sequences to thereby reduce interference between the users of the neighbor cells and improve communication quality of the user at the edge of the cell. Moreover, after the pilot symbol is modulated and mapped into the repeat data element blocks, a state and a channel response of a radio channel can be estimated accurately from the pilot symbol in the repeat data element blocks by the reception end upon reception of the repeat data element blocks to thereby detect and demodulate properly the received signal. The use of the technical solutions of the invention can achieve effective, reliable and variable-rate transmission of information over a radio communication channel and also multiplexing and multiple access of radio communication channel resources. An application of the method and device in a radio mobile cellular system can conveniently implement a same frequency network and improve the capacity and performance of the system. The proposed method can address well the issues of allocation and scheduling of resources and coordination and control of interference (including inter-cell and intra-cell interference) in radio communication to thereby improve greatly the capacity and performance.

DETAILED DESCRIPTION OF THE INVENTION

The invention proposes the idea of a "block repeat division multiple access", a solution of which is a new efficient multiple access solution. Block Repeat (BR) based information transmission can be referred to as block repeat transmission. Block repeat based multiplexing can be referred to as Block Repeat Division Multiplexing (BRDM). Block repeat based multiple-access can be referred to as Block Repeat Division Multiple-Access (BRDMA). A block repeat division multiple-access solution combined with OFDM can be referred to as Block Repeat-Orthogonal Frequency Division Multiplexing (BR-OFDM) and Block Repeat-Orthogonal Frequency Division Multiple-Access (BR-OFDMA).

The invention will be detailed below with reference to the drawings and embodiments to make the invention more apparent to those skilled in the art.

Figure 2:
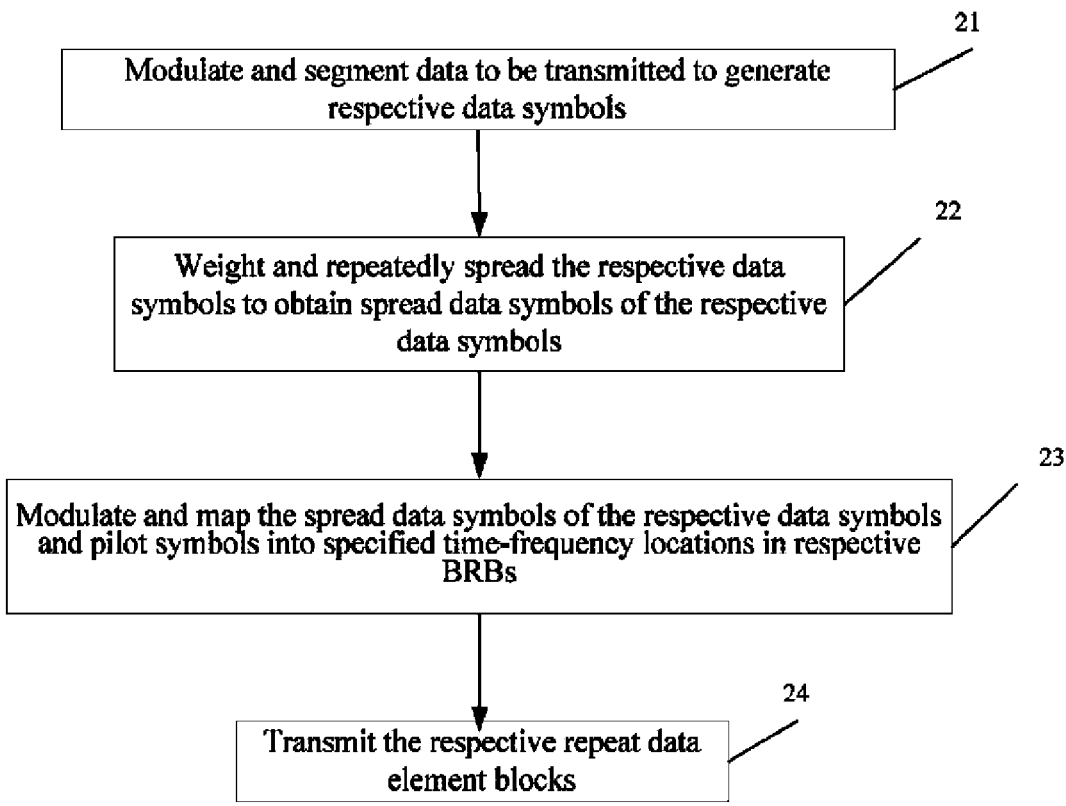
FIG. 2 is a flow chart of a signal transmission method according to an embodiment of the invention.

Reference is made to FIG. 2 illustrating a flow chart of a signal transmission method according to an embodiment of the invention.

In step 21, data to be transmitted is modulated and segmented into respective data symbols; and In step 22, the respective data symbols are weighted and repeatedly spread to obtain spread data symbols of the respective data symbols.

The data to be transmitted can be weighted and repeatedly spread with a preconfigured Repeat Factor (RF), i.e., the number of times that the data symbols are repeated. Moreover, a set of weight factor sequences can be preconfigured for a repeat factor, and the set of weight factor sequences can be referred to as a weight factor sequence group corresponding to the repeat factor. The weight factor sequence can also be referred to as Repeat Codes (RC) sequence.

Each weight factor sequence corresponding to a repeat factor includes weight factors, the number of the weight factors is the repeat factor. If the repeat factor is N, then each weight factor sequence corresponding to the repeat factor includes N weight factors.

During weighting and repeatedly spreading a data symbol M to be transmitted, the preconfigured repeat factor is assumed as N, firstly the data symbol M to be transmitted is repeated to obtain N data symbols M to be transmitted according to the preconfigured repeat factor. Then an available weight factor sequence is selected from the weight factor sequence group corresponding to the repeat factor. The available weight factor sequence as mentioned here refers to a weight factor sequence which has not been allocated to another user.

One of the N data symbols to be transmitted obtained by repeating can be multiplied by one of the weight factors in the selected weight factor sequence to obtain a weighted data symbol. The N data symbols to be transmitted obtained by repeating can be multiplied respectively by the N weight factors in the selected weight factor sequence to obtain N weighted data symbols to thereby weight and repeatedly spread the data symbol M to be transmitted, where each weighted data symbol can be regarded as a spread data symbol of the data symbol M to be transmitted.

It is assumed that the repeat factor is four and the selected weight factor sequence includes four weight factors ($C_1$, $C_2$, $C_3$ and $C_4$). The data symbol M is repeated to obtain four data symbols M; and one of the data symbols M can be multiplied by $C_1$ to obtain a first spread data symbol, one of the data symbols M can be multiplied by $C_2$ to obtain a second spread data symbol, one of the data symbols M can be multiplied by $C_3$ to obtain a third spread data symbol, and one of the data symbols M can be multiplied by $C_4$ to obtain a fourth spread data symbol.

When there is a block of data symbols to be transmitted, the block of data symbols can be divided into a data symbol group. Then, the respective data symbols in the data symbol group can be weighted and repeatedly spread in unit of group to obtain spread data symbols of the respective data symbols in unit of group, which are referred to as spread data symbol groups. A process of weighting and repeatedly spreading the respective data symbols in the data symbol group is the same as that of weighting and repeatedly spreading a single data symbol, and repeated descriptions thereof will be omitted here.

After the spread data symbols of the respective data symbols is obtained, the spread data symbols of the respective data symbols and a pilot symbol are modulated and mapped into specified time-frequency locations in respective corresponding Block Repeat Resource Blocks (BRB) to obtain respective corresponding repeat data element blocks in the step 23. Then, the respective repeat data element blocks are transmitted in the step 24.

Figure 1:
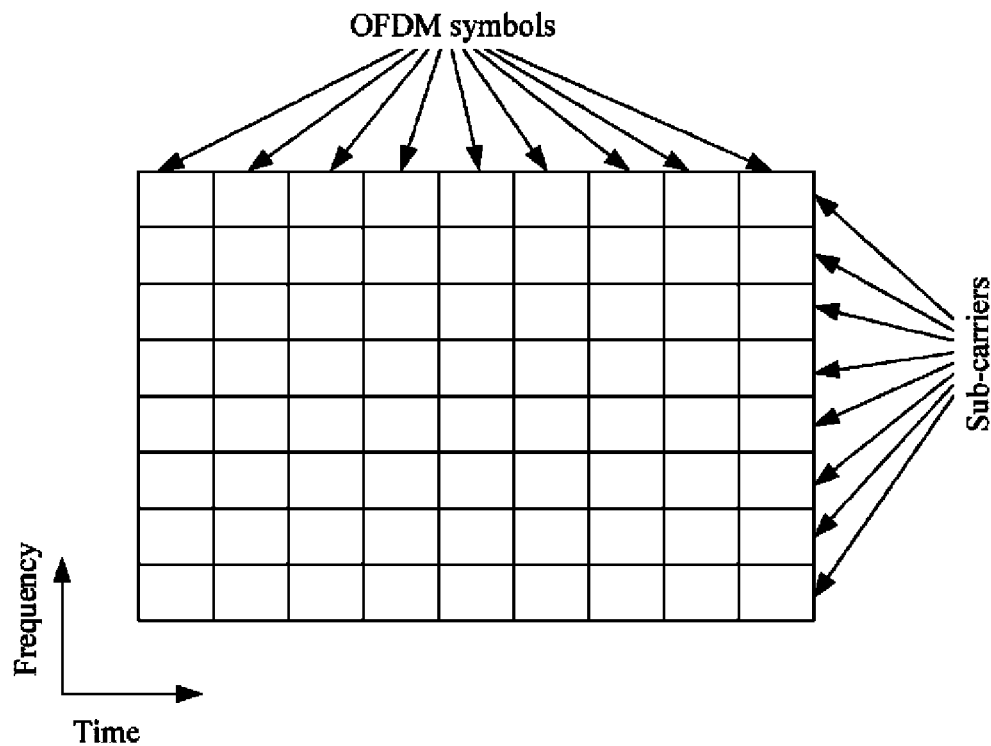
FIG. 1 is a schematic diagram of a PRB using OFDM in the prior art.
Figures 1A, 3:
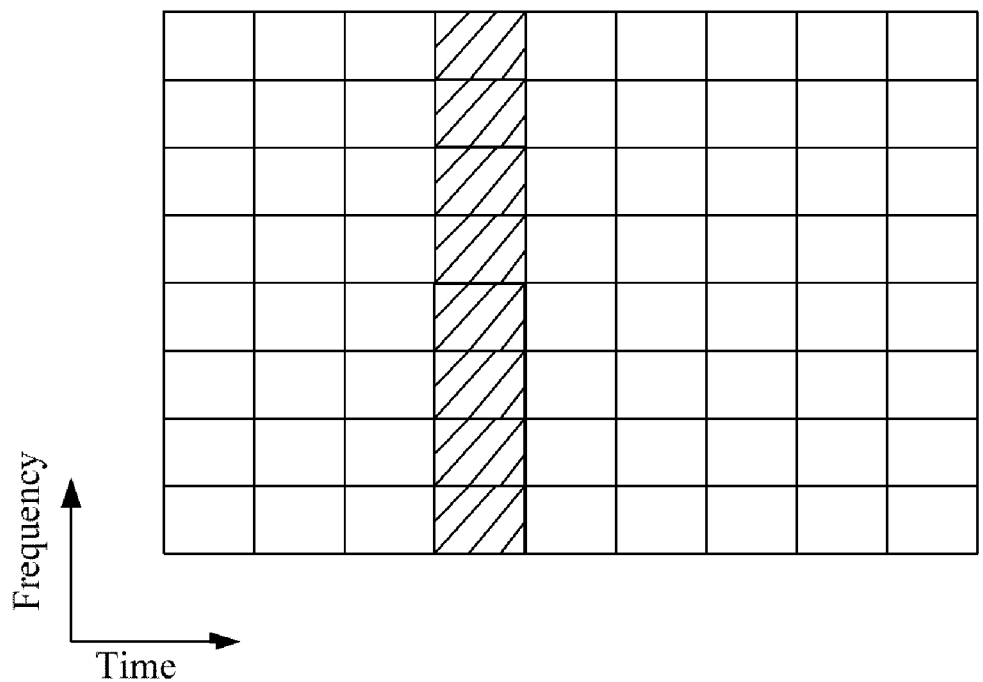
FIG. 3-1a, FIG. 3-1b, FIG. 3-1c, FIG. 3-2a, FIG. 3-2b, FIG. 3-2c, FIG. 3-2d and FIG. 3-3 are schematic diagram of modulating and mapping a pilot symbol into a repeat data element block according to an embodiment of the invention.
Figures 1B, 3:
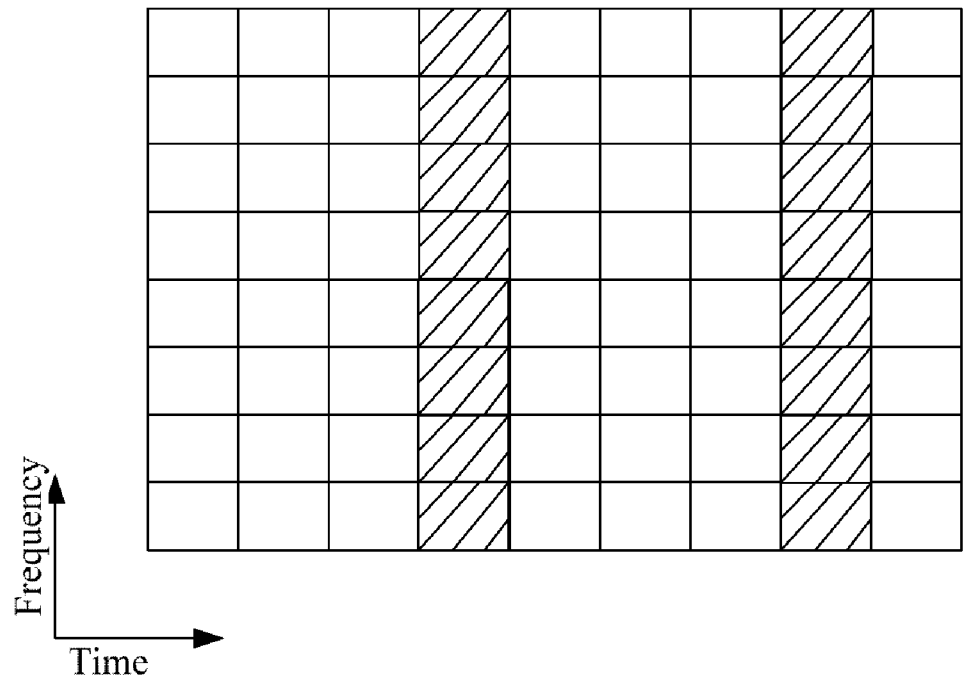
Figures 1C, 3:
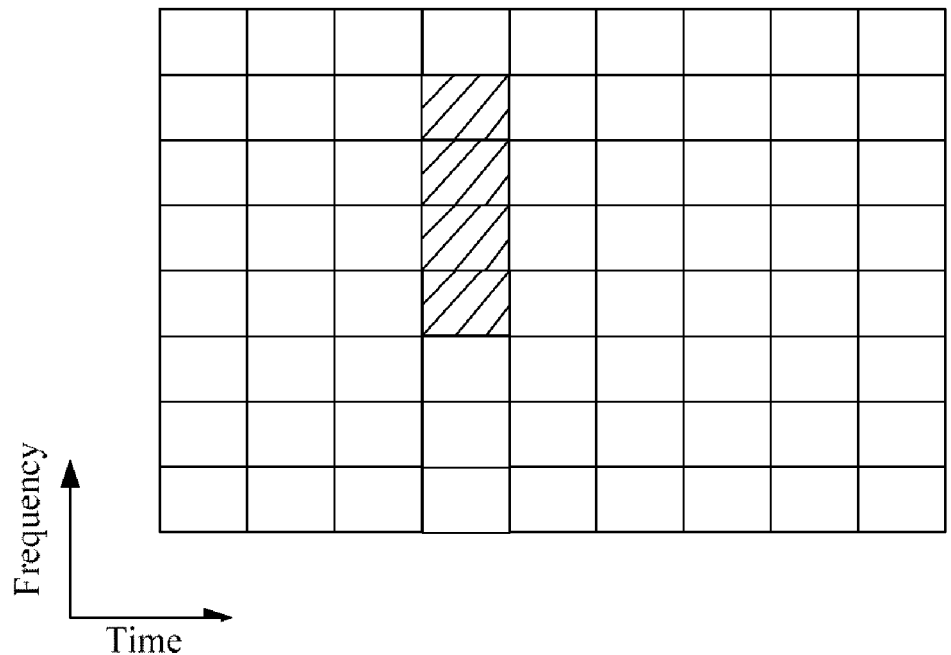
Figures 2A, 3:
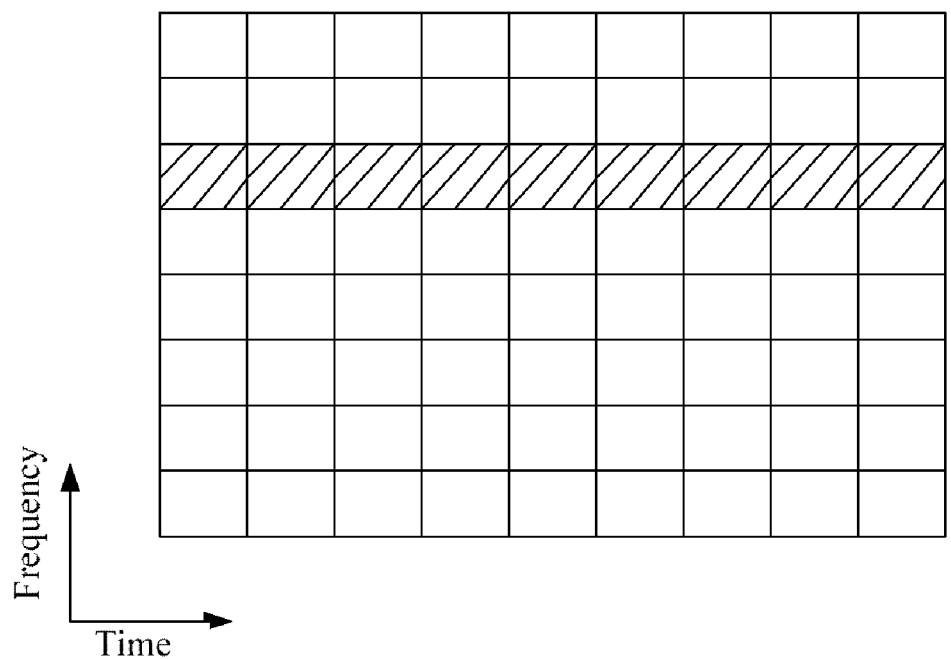
Figures 2B, 3:
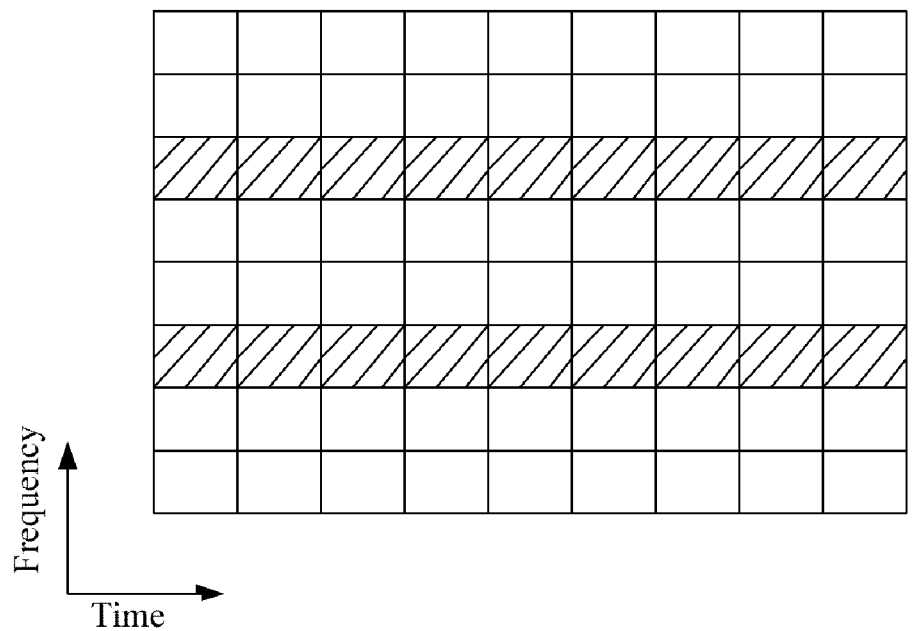
Figures 2C, 3:
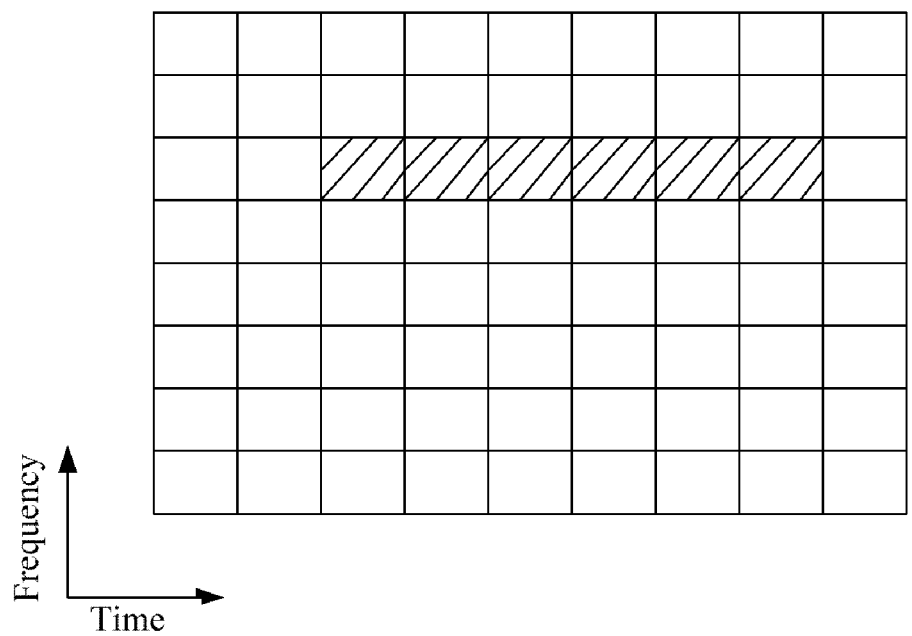
Figures 2D, 3:
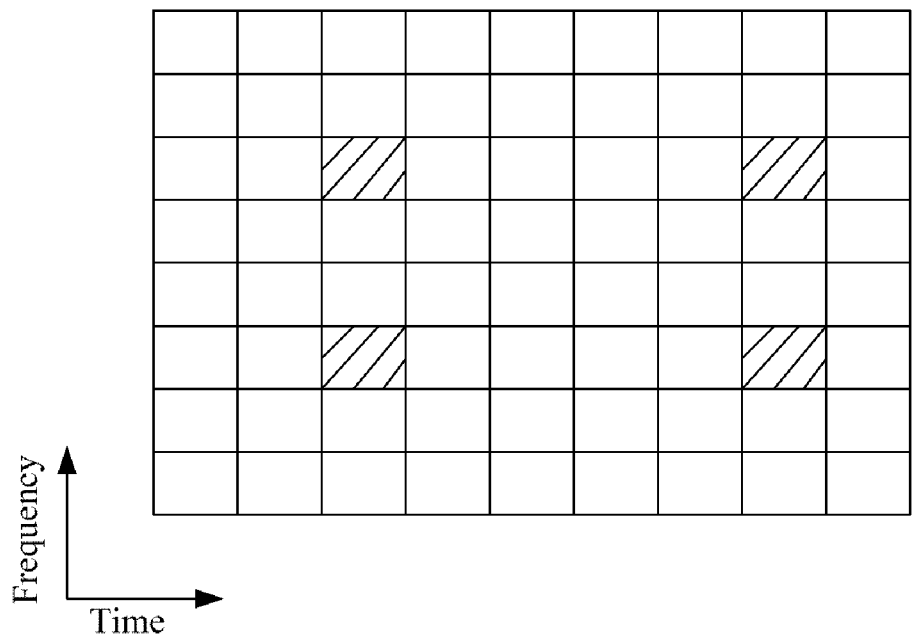
Figure 3:
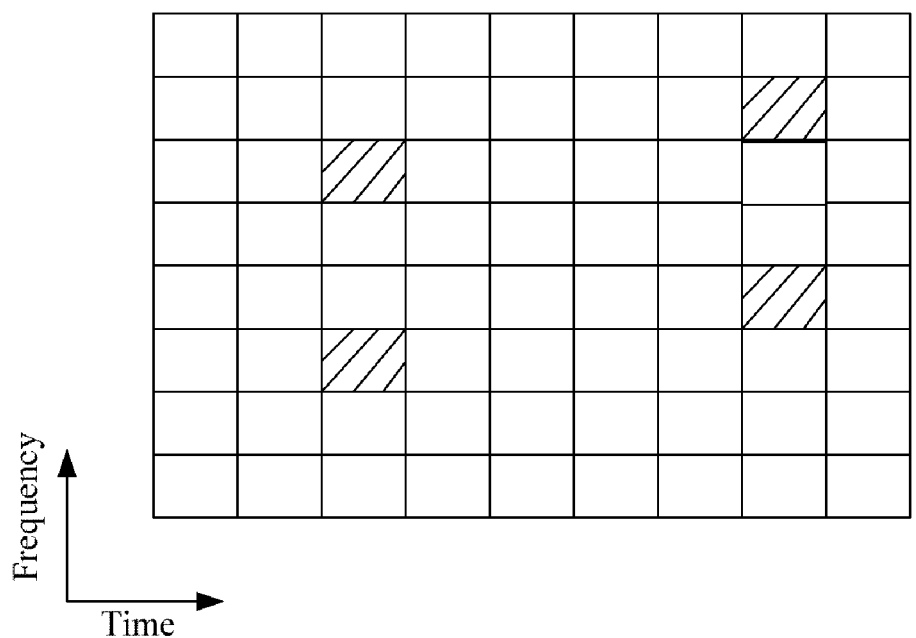

In a BR-OFDM system, a BRB is an elementary physical resource unit including a block of consecutive OFDM symbols in the time domain and also a block of consecutive orthogonal sub-carriers in the frequency domain. The size of a BRB shall be predetermined. A group of several BRBs can be referred to as a Block Repeat resource Block Group (BRBG). The respective BRBs constituting the BRBG may or may not be consecutive in the time and/or frequency domain. A BRBG in which respective constituent BRBs are consecutive in the time domain can be referred to as a time-consecutive BRBG (as illustrated in FIG. 3-1), and a BRBG in which respective constituent BRBs are consecutive in the frequency domain can be referred to as a frequency-consecutive BRBG (as illustrated in FIG. 3-2). A BRBG in which respective constituent BRBs are consecutive in both the time and frequency domains can be referred to as a time- and frequency-consecutive BRBG (as illustrated in FIG. 3-3).

During repeat modulation, respective spread data symbol groups of a data symbols group shall be modulated and mapped into respective BRBs in the same BRBG with each of the spread data symbol groups corresponding to one of the BRBs. A pilot symbol shall also be modulated and mapped into specific time-frequency locations in the respective BRBs.

As can be apparent, the number of BRBs included in a BRBG is the repeat factor of a data symbol group. For scheduling of time-frequency resources, the time-frequency resources can be allocated by BRBG to users according to service rate and quality demands of the users, for example, one or more BRBGs can be allocated to a user. Repeat factors of BRBGs allocated to different users may be identical or different.

A spread data symbol group and a pilot symbol can be modulated and mapped into a BRB to obtain a repeat data element block. As can be apparent, the repeat data element block refers to a block of time-frequency resources into which the spread data symbol group and the pilot symbol are modulated and mapped.

As can be apparent, after the pilot symbol is modulated and mapped into the repeat data element blocks, a state and a channel response of a radio channel can be estimated accurately from the pilot symbol in the repeat data element blocks by the reception end upon reception of the repeat data element blocks to thereby detect and demodulate properly the received signal.

A pilot symbol can be modulated and mapped into a repeat data element block in the following approaches but will not be limited thereto:

a. A pilot symbol can be modulated and mapped over at least one sub-carrier of the same OFDM symbol in a repeat data element block, and FIG. 3-1*a*, FIG. 3-1*b* and FIG. 3-1*c* are three schematic diagrams of this approach respectively;

b. A pilot symbol can be modulated and mapped over the same sub-carrier of at least one OFDM symbol in a repeat data element block, and FIG. 3-2*a*, FIG. 3-2*b*, FIG. 3-2*c* and FIG. 3-2*d* are four schematic diagrams of this approach respectively; and c. A pilot symbol can be modulated and mapped over different sub-carriers of a plurality of OFDM symbol in a repeat data element block, and FIG. 3-3 is a schematic diagram of this approach.

It shall be noted that a pilot symbol modulated and mapped into a repeat data element block can be a common or dedicated pilot symbol.

Since a common pilot symbol is for channel estimation by all users in a cell, there is no need to weight and repeatedly spread the common pilot symbol. Since a dedicated pilot symbol is for channel estimation by a specific user, the dedicated pilot symbol shall be weighted and repeatedly spread, so corresponding spread dedicated pilot symbols shall be modulated and mapped into respective repeat data element blocks.

A weight factor sequence used for weighting and repeatedly spreading a dedicated pilot symbol shall be the weight factor sequence used for a corresponding data symbol.

If a repeat factor of a data symbol M is four and a selected weight factor sequence includes four weight factors ($C_1$, $C_2$, $C_3$ and $C_4$), then a dedicated pilot symbol can be weighted and repeatedly spread also by that weight factor sequence.

Firstly, the dedicated pilot symbol is repeated to obtain four dedicated pilot symbols according to the repeat factor. One of the dedicated pilot symbols can be multiplied by $C_1$ to obtain a first spread dedicated pilot symbols, one of the dedicated pilot symbols can be multiplied by $C_2$ to obtain a second spread dedicated pilot symbol, one of the dedicated pilot symbols can be multiplied by $C_3$ to obtain a third spread dedicated pilot symbol, and one of the dedicated pilot symbol can be multiplied by $C_4$ to obtain a fourth spread dedicated pilot symbol.

After the four spread dedicated pilot symbols are obtained, the first spread dedicated pilot symbol and the first spread data symbol are modulated and mapped into the same corresponding BRB to obtain a first repeat data element block; the second spread dedicated pilot symbol and the second spread data symbol are modulated and mapped into the same corresponding BRB to obtain a second repeat data element block; the third spread dedicated pilot symbol and the third spread data symbol are modulated and mapped into the same corresponding BRB to obtain a third repeat data element block; and the fourth spread dedicated pilot symbol and the fourth spread data symbol are modulated and mapped into the same corresponding BRB to obtain a fourth repeat data element block.

When a pilot symbol modulated and mapped in to a repeat data element block is a common pilot symbol, a corresponding transmitted signal generally is a downlink signal.

In case of transmission of a downlink signal, the network side determines a BRBG and a weight factor sequence for transmission of a data symbol are and then notifies in advance to respective User Equipments (UE) about information on the BRBG, information on the weight factor sequence, pilot configuration information and other relevant control information through broadcast or control channel so that the respective UEs can receive repeat data element blocks, perform channel estimation from a common pilot symbol in the respective repeat data element blocks and weight and combine data symbols in the respective repeat data element blocks using the weight factor sequence.

When a pilot symbol modulated and mapped into a repeat data element block is a dedicated pilot symbol, a corresponding transmitted signal can be a downlink or uplink signal.

In case of transmission of a downlink signal, the network side determines a BRBG and a weight factor sequence for transmission of a data symbol and then notifies in advance to a relevant UE about information on the BRBG, information on the weight factor sequence, pilot configuration information and other relevant control information so that the UE can receive repeat data element blocks, perform channel estimation from spread dedicated pilot symbols in the respective repeat data element blocks and weight and combine data symbols in the respective repeat data element blocks using the weight factor sequence.

The UE can also perform an inverse operation on the spread dedicated pilot symbols in the received plurality of repeat data element blocks to derive the weight factor sequence used for weighting and repeatedly spreading the dedicated pilot symbol, i.e., the weight factor sequence used for weighting and repeatedly spreading the data symbol, and in this case, the network side may not notify in advance the weight factor sequence to the UE.

The UE performs an inverse operation to derive the weight factor sequence in the following process:

The received spread dedicated pilot symbols and the un-weighted dedicated pilot symbol are compared, and an inverse operation is performed according to a comparison result to derive the weight factor sequence used for weighting and repeatedly spreading the dedicated pilot symbol.

For example, the UE receives the respective spread dedicated pilot symbols {1, −1, −1, 1} and derives the un-weighted dedicated pilot symbol {1, 1, 1, 1} from the pilot configuration information to thereby derive the weight factor sequence (1, −1, −1, 1) for weighting and repeatedly spreading the dedicated pilot symbol {1, 1, 1, 1} through comparison and an inverse operation.

It shall be noted that interference between neighbor cells may degrade the performance of a cellular mobile communication system. Therefore, both the design of a dedicated pilot and that of a common pilot shall be considered carefully for channel estimation in order to reduce interference between neighbor cells. For transmission of a signal between neighbor cells, a pilot symbol can be modulated and mapped in the following approaches to further reduce mutual interference between the neighbor cells. The pilot symbol as mentioned here can be a dedicated or common pilot symbol.

In the approach of Time Division Multiplexing (TDM):

Pilot symbols of two neighbor cells shall be modulated and mapped into different OFDM symbols, and the pilot symbols of the two neighbor cells do not temporally overlap and thus can be orthogonal to reduce mutual interference. A cell can transmit data in an OFDM symbol occupied by another cell.

The OFDM symbol can alternatively be unused without transmission of any data to further reduce interference to the pilot symbols.

The TDM approach is designed primarily for block-type pilots and decentralized pilots.

In the approach of Frequency Division Multiplexing (FDM):

Pilot symbols of two neighbor cells can be modulated and mapped into different orthogonal sub-carriers, and the pilot symbols of the two neighbor cells are orthogonal in the frequency domain and thus can reduce mutual interference. A cell can transmit data over a sub-carrier occupied by another cell.

The sub-carrier can alternatively be unused without transmission of any data to further reduce interference to the pilot symbols.

The FDM approach is designed primarily for comb-type pilots and decentralized pilots.

In the approach of Code Division Multiplexing (CDM):

If pilot symbols of two neighbor cells are modulated and mapped into the same time-frequency resource location, then the pilot symbols may overlap between the cells in a synchronous system. At this time, a orthogonal sequence set $S=\{S_1, S_2, \ldots, S_k\}$ including k orthogonal sequences can be arranged, each of the orthogonal sequence is $S_i=[S_{i\_1}, S_{i\_2}, \ldots, S_{i\_m}]$, $1 \leq i \leq k$. Each of pilot sequences of the different cells is multiplied by one of orthogonal sequences $S_i$ to obtain a weighted pilot sequence, and mutual interference of the pilot symbols of the different cells can be reduced due to the orthogonality of sequences $S_i$.

As can be apparent, the three approaches of modulating and mapping a pilot symbol between neighbor cells, i.e., TDM, FDM and CDM, can be used alone or in combination, and repeated descriptions thereof will be omitted here.

Multiple antennas shall also be considered for using a pilot symbol in a BR-OFDM system. In an existing broadcast communication system, multiple antennas are typically used for transmission of data in order to increase capacity of the system and thereby to improve transmission capability of the system, and a typical application is Multiple Input Multiple Output.

In MIMO, antennas can be categorized into virtual and physical antennas, where the so-called virtual antennas refer to that the number of antennas at the transmission end shall be distinguished at the reception end, and the physical antennas refer to the number of real antennas used in practice for transmission of data at the transmission end. In order to be capable of accurately detecting and demodulating data transmitted over different antennas, information on channels for transmission of data over the respective virtual antennas from the transmission end to the reception end shall be estimated separately at the reception end. Therefore, the respective virtual antennas shall be distinguished by separate pilots. The pilots of the different virtual antennas can be distinguished in the TDM, FDM or CDM approach.

For pilot symbol modulation and mapping in the TDM approach, respective antennas are provided with separate pilot symbols for downlink transmission in the same cell so that the pilot symbols of the antennas are modulated and mapped into different OFDM symbols. Orthogonality is maintained by temporally non-overlapping.

For pilot symbol modulation and mapping in the FDM approach, respective antennas are provided with separate pilot symbols for downlink transmission in the same cell so that the pilot symbols of the antennas are modulated and mapped over different sub-carriers. Orthogonality is maintained by frequency non-overlapping.

For pilot symbol modulation and mapping in the CDM approach, pilot symbols of all antennas are modulated and mapped into the same time-frequency resource locations for downlink transmission in the same cell, but pilot symbols of respective antennas are multiplied by different orthogonal sequences to obtain orthogonal pilot symbols. One of the orthogonal pilot symbols can be selected for the pilot of each of the antennas so that the pilot symbols of the multiple antennas are orthogonal in the form of code division and thus channel information can be estimated from the orthogonal pilot symbols at the reception end.

For a BR-OFDM system, if an elementary block can be represented as $N_b = N_{bt} \times N_{bf}$ ($N_{bt}$ is the number of OFDM symbols and $N_{bf}$ is the number of sub-carriers) in a self-contained pilot design approach, then $N_{bt}$ OFDM symbols all shall include pilot symbols corresponding to respective virtual antennas in a block-type pilot design, $N_{bf}$ sub-carriers all shall include pilot symbols corresponding to respective virtual antennas in a comb-type Pilot design, or $N_{bt}$ OFDM symbols or $N_{bf}$ sub-carriers shall include pilot symbols corresponding to respective virtual antennas in a decentralized pilot design. The pilot symbols can be multiplexed in the TDM, FDM or CDM approach.

Figure 4:
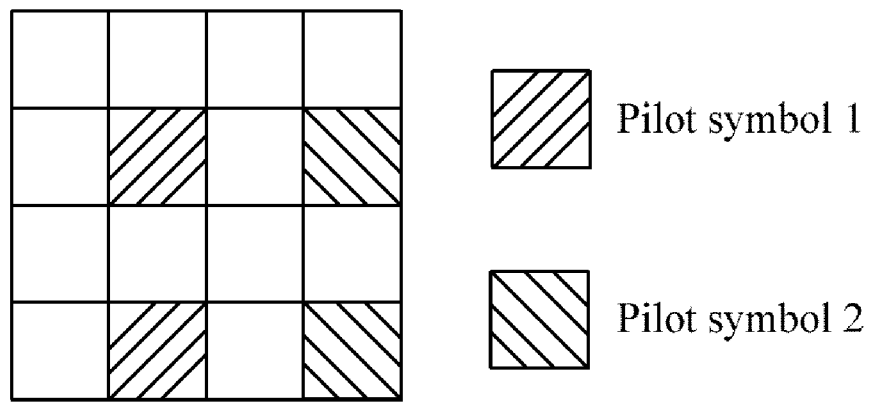
FIG. 4 is a schematic diagram of a decentralized pilot design of an MIMO antenna according to an embodiment of the invention.

FIG. 4 illustrates a decentralized pilot design of 2×2 MIMO. A BRB illustrated in FIG. 4 includes four OFDM symbols and four sub-carriers, i.e., sixteen time-frequency resource locations. Four pilot symbols are modulated and mapped respectively into the sixteen time-frequency resource locations of the BRB to occupy two sub-carriers in total of two OFDM symbols. The density of pilot symbols in the frequency domain is the same as that of single antennas. Since pilot symbols are modulated and mapped into two OFDM symbols, the pilot symbol 1 can be selected as the pilot symbol of the antenna 1, and the pilot symbol 2 can be selected as the pilot symbol of the antenna 2. The pilot symbols in the two OFDM symbols can also be multiplied by orthogonal sequence with a length of 2 to distinguish the antennas 1 and 2 by the different orthogonal sequences.

Figure 5:
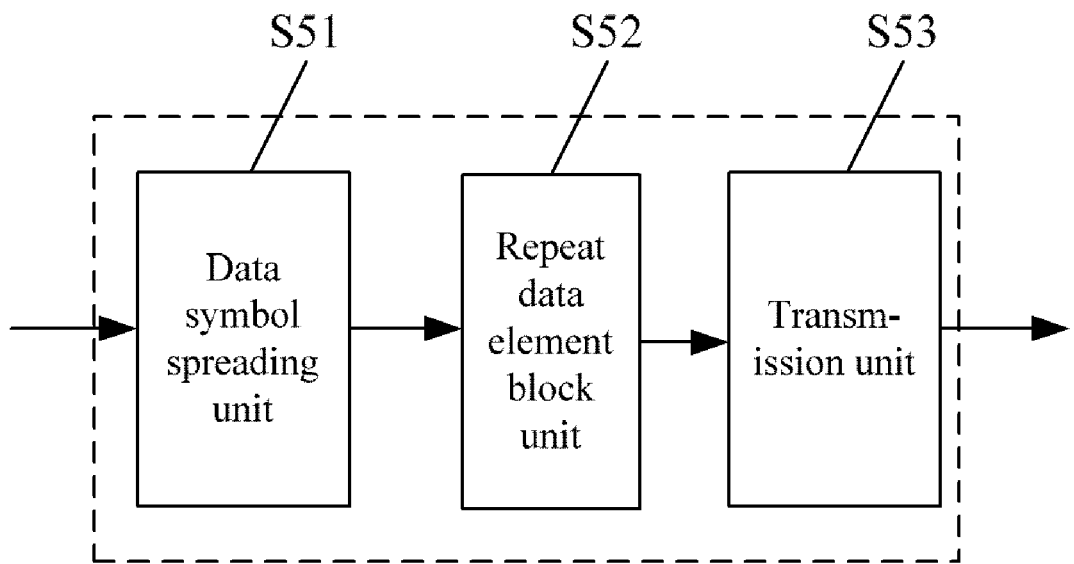
FIG. 5 is a schematic structural diagram of a signal transmission device according to an embodiment of the invention.

The invention further proposes a corresponding signal transmission device based upon the foregoing signal transmission method, and FIG. 5 is a schematic diagram of the device. The device includes a data symbol spreading unit S51, a repeat data element block unit S52 and a transmission unit S53.

After a transmission end device modulates and segments data to be transmitted into data symbols, the data symbol spreading unit S51 weights and repeatedly spreads the data symbols to be transmitted into spread data symbols of the respective data symbols.

The data symbol spreading unit S51 can weight and repeatedly spread the data symbols to be transmitted with a preconfigured RF. Moreover, a plurality of weight factor sequences can be preconfigured for a repeat factor. The weight factor sequence can also be referred to as Repeat Code (RC) sequence.

Each weight factor sequence corresponding to a repeat factor includes weight factors, the number of the weight factors is the repeat factor. If the repeat factor is N, then each weight factor sequence corresponding to the repeat factor includes N weight factor.

The preconfigured repeat factor is assumed as N, and during weighting and repeatedly spreading of a data symbol M to be transmitted, the data symbol spreading unit S51 firstly repeats the data symbol M to be transmitted by the preconfigured repeat factor to obtain N data symbols M to be transmitted. Then, the data symbol spreading unit S51 selects an available weight factor sequence from a weight factor sequence group corresponding to the repeat factor. The available weight factor sequence as mentioned here refers to a weight factor sequence which has not been allocated to another user.

The data symbol spreading unit S51 can multiply one of the N data symbols to be transmitted obtained by repeating by one of the weight factors in the selected weight factor sequence to obtain a weighted data symbol. The N data symbols to be transmitted obtained by repeating can be multiplied respectively by the N weight factors in the selected weight factor sequence to obtain N weighted data symbols to thereby weight and repeatedly spread the data symbol M to be transmitted, where each weighted data symbol can be regarded as a spread data symbol of the data symbol M to be transmitted.

It is assumed that the repeat factor is four and the selected weight factor sequence includes four weight factors ($C_1$, $C_2$, $C_3$ and $C_4$). The data symbol M is repeated to obtain four data symbols M; and one of the data symbols M can be multiplied by $C_1$ to obtain a first spread data symbol, one of the data symbols M can be multiplied by $C_2$ to obtain a second spread data symbol, one of the data symbols M can be multiplied by $C_3$ to obtain a third spread data symbol, and one of the data symbols M can be multiplied by $C_4$ to obtain a fourth spread data symbol.

When there is a plurality of data symbols to be transmitted, the data symbol spreading unit S51 can divide the plurality of data symbols into a data symbol group. Then, the respective data symbols in the data symbol group can be weighted and repeatedly spread in unit of group to obtain spread data symbols of the respective data symbols in unit of group, which are referred to as spread data symbol groups. A process of weighting and repeatedly spreading the respective data symbols in the data symbols group is the same as that of weighting and repeatedly spreading a single data symbol, and repeated descriptions thereof will be omitted here.

After obtaining the spread data symbols of the respective data symbols, the repeat data element block unit S52 can modulate and map the spread data symbols of the respective data symbols, which are obtained by the data symbol spreading unit S51, and a pilot symbol into specified time-frequency locations in respective corresponding BRBs to obtain respective corresponding repeat data element blocks. Then, the transmission unit S53 transmits the respective repeat data element blocks obtained by the repeat data element block unit S52.

It shall be noted that the pilot symbol modulated and mapped into a repeat data element block by the repeat data element block unit S52 can be a common or dedicated pilot symbol.

Since a common pilot symbol is for channel estimation by all users in a cell, there is no need to weight and repeatedly spread the common pilot symbol. Since a dedicated pilot symbol is for channel estimation by a specific user, the dedicated pilot symbol shall be weighted and repeatedly spread, corresponding spread dedicated pilot symbols shall be modulated and mapped into respective repeat data element blocks. In this case, the device illustrated in FIG. 5 shall further include a pilot symbol spreading unit.

The pilot symbol spreading unit is adapted to multiply a dedicated pilot symbol by respective weight factors in a weight factor sequence to weight and repeatedly spread the dedicated pilot symbol to obtain respective spread dedicated pilot symbols.

A weight factor sequence used for weighting and repeatedly spreading a dedicated pilot symbol shall be the weight factor sequence used for a corresponding data symbol.

If a repeat factor of a data symbol M is four and a selected weight factor sequence includes four weight factors ($C_1$, $C_2$, $C_3$ and $C_4$), then a dedicated pilot symbol can be weighted and repeatedly spread also by that weight factor sequence.

Firstly, the pilot symbol spreading unit repeats the dedicated pilot symbol by the repeat factor to obtain four dedicated pilot symbols. Then, the pilot symbol spreading unit can multiply one of the dedicated pilot symbols by $C_1$ to obtain a first spread dedicated pilot symbols, multiply one of the dedicated pilot symbol by $C_2$ to obtain a second spread dedicated pilot symbol, multiply one of the dedicated pilot symbols by $C_3$ to obtain a third spread dedicated pilot symbol, and multiply one of the dedicated pilot symbol by $C_4$ to obtain a fourth spread dedicated pilot symbol.

After the pilot symbol spreading unit obtains the four spread dedicated pilot symbols, the repeat data element block unit S52 modulates and maps the first spread dedicated pilot symbol and the first spread data symbol into the same corresponding BRB to obtain a first repeat data element block; the repeat data element block unit S52 modulates and maps the second spread dedicated pilot symbol and the second spread data symbol into the same corresponding BRB to obtain a second repeat data element block; the repeat data element block unit S52 modulates and maps the third spread dedicated pilot symbol and the third spread data symbol into the same corresponding BRB to obtain a third repeat data element block; and the repeat data element block unit S52 modulates and maps the fourth spread dedicated pilot symbol and the fourth spread data symbol into the same corresponding BRB to obtain a fourth repeat data element block.

As can be apparent, after the pilot symbol is modulated and mapped the repeat data element blocks, a state and a channel response of a radio channel can be estimated accurately from the pilot symbols in the repeat data element blocks by the reception end upon reception of the repeat data element blocks to thereby detect and demodulate properly the received signal.

A pilot symbol can be modulated and mapped into a repeat data element block in the following approaches but will not be limited thereto:
  a. A pilot symbol can be modulated and mapped over at least one sub-carrier of the same OFDM symbol in a repeat data element block, and FIG. 3-1a, FIG. 3-1b and FIG. 3-1c are three schematic diagrams of this approach respectively;
  b. A pilot symbol can be modulated and mapped over the same sub-carrier of at least one OFDM symbol in a repeat data element block, and FIG. 3-2a, FIG. 3-2b, FIG. 3-2c and FIG. 3-2d are four schematic diagrams of this approach respectively; and
  c. A pilot symbol can be modulated and mapped over different sub-carriers of a plurality of OFDM symbol in a repeat data element block, and FIG. 3-3 is a schematic diagram of this approach.

As can be apparent, the method and device according to the invention can be applicable to both an existing base station (Node B), a Radio network Controller (RNC) or a user terminal and an evolved base station (eNode B) and user terminal as well as some network side devices functionally similar to a base station and a user terminal in a future communication system.

Those skilled in the art can appreciate that the respective illustrative steps of the method and units of the device described here in connection with the disclosed embodiments can be implemented in electric hardware, in software or in combination thereof. The foregoing illustrative steps and units have been described in general in term of their functions in order to illustrate clearly exchangeability between hardware and software. Whether these functions are implemented in hardware or software is dependent upon a specific application and a design constrain of implementing the system. Those skilled in the art can implement the described functions in various ways for respective specific applications, but such an implementation result shall not be construed as departing from the scope of the invention.

The respective illustrative units described in connection with the embodiments disclosed here can be implemented or performed with a general processor, a Digital Signal Processor (DSP), an Application Specific Integrated Circuit (ASIC), a Field Programmable Gate Array (FPGA) or other programmable logic devices, discrete gate or transistor logic, discrete hardware component or any combination thereof. The general processor may be a microprocessor, but in another case, the processor can be any conventional processor, controller, micro-controller or state machine. The processor can alternatively be implemented as a combination of computing devices, e.g., a combination of a DSP and a microprocessor, a plurality of microprocessors, one or more microprocessors integrated with a DSP core or any other such a structure.

The steps of the method described in connection with the embodiments disclosed above can be embodied directly as hardware, a software module executed by a processor or a combination of both. The software module can reside in a RAM memory, a flash memory, a ROM memory, an EPROM memory, an EEPROM memory, a register, a hard disk, a removable disk, a CD-ROM or any other storage medium well known in the art. A typical storage medium is coupled with a processor so that the processor can read information from and write information into the storage medium. Alternatively, the storage medium is a constituent part of the processor. The processor and the storage medium can be stored in an ASIC and the ASIC possibly residing in a user station. Alternatively, the processor and the storage medium can exist as discrete components in a user station.

The disclosed embodiments have been provided so that those skilled in the art can implement or apply the invention. Various modifications to these embodiments will be obvious to those skilled in the art, and also the general principal defined here can be applicable to other embodiments without departing from the scope and spirit of the invention. The embodiments described above are merely preferred embodiments of the invention but not intended to limit the invention, and any modifications, equivalents or improvements made without departing from the spirit and principal of the invention shall come into the scope of protection of the invention.

What is claimed is:

1. A signal transmission method, comprising:
  weighting and repeatedly spreading respective data symbols to be transmitted, to obtain spread data symbols of the respective data symbols;
  modulating and mapping the spread data symbols of the respective data symbols and a pilot symbol into specified time-frequency locations in respective corresponding Block Repeat resource Blocks, BRBs, to obtain respective corresponding repeat data element blocks; and
  transmitting the respective repeat data element blocks;
  wherein weighting and repeatedly spreading the respective data symbols to be transmitted comprises:
    repeating the data symbols by a Repeat Factor, RF, and selecting an available weight factor sequence from a group of weight factor sequences corresponding to the RF; and
    multiplying the respective data symbols obtained by repeating by respective weight factors in the selected weight factor sequence to weight and repeatedly spread the data symbols.

2. The method according to claim 1, wherein the pilot symbol is a dedicated pilot symbol, and the method further comprises weighting and repeatedly spreading the dedicated pilot symbol using the respective weight factors in the weight factor sequence, to obtain respective spread dedicated pilot symbols.

3. The method according to claim 2, further comprising:
repeating the dedicated pilot symbol by the RF; and
multiplying the respective dedicated pilot symbols obtained by repeating by the respective weight factors in the weight factor sequence to weight and repeatedly spread the dedicated pilot symbol.

4. The method according to claim 2, further comprising:
comparing the respective spread dedicated pilot symbols in the respective repeat data element blocks with the un-weighted dedicated pilot symbol, by a receiving end device, upon reception of the respective repeat data element blocks; and
performing an inverse operation to derive the weight factor sequence for weighting and repeatedly spreading the dedicated pilot symbol.

5. The method according to claim 1, wherein the pilot symbol is a common pilot symbol.

6. The method according to claim 1, wherein pilot symbols of users of neighbor cells are modulated and mapped into non-overlapping time-frequency resource locations in BRBs.

7. The method according to claim 1, wherein sequences used by pilot symbols of users of neighbor cells are orthogonal each other.

8. The method according to claim 1, wherein pilot symbols transmitted over different antennas are modulated and mapped into non-overlapping time-frequency resource locations in BRBs.

9. The method according to claim 1, wherein sequences used by pilot symbols transmitted over different antennas are orthogonal each other.

10. A signal transmission device, comprising:
a data symbol spreading unit configured to weight and repeatedly spread respective data symbols to be transmitted, to obtain spread data symbols of the respective data symbols;
a repeat data element block unit configured to modulate and map the spread data symbols, which are obtained by the data symbol spreading unit, and a pilot symbol into specified time-frequency locations in respective corresponding Block Repeat resource Blocks, BRBs, to obtain respective corresponding repeat data element blocks; and
a transmission unit configured to transmit the respective repeat data element blocks obtained by the repeat data element block unit;
wherein the data symbol spreading unit weight and repeatedly spreads the data symbols to be transmitted by a Repeat Factor, RF, and the data symbol spreading unit comprises:
a module configured to repeat the data symbols by the RF and to select an available weight factor sequence from a group of weight factor sequences corresponding to the RF; and
a module configured to multiply respective weight factors in the selected weight factor sequence by the respective data symbols obtained by repeating to weight and repeatedly spread the data symbols.

11. The device according to claim 10, wherein the pilot symbol is a spread dedicated pilot symbol, and the device further comprises:
a pilot symbol spreading unit configured to weight and repeatedly spread the dedicated pilot symbol using the respective weight factors in the weight factor sequence to obtain respective spread dedicated pilot symbols.

12. The device according to claim 11, wherein the pilot symbol spreading unit comprises:
a module configured to repeat the dedicated pilot symbol by the RF; and
a module configured to multiply the respective dedicated pilot symbols obtained by repeating by the respective weight factors in the weight factor sequence to weight and repeatedly spread the dedicated pilot symbol.

13. The device according to claim 10, wherein the pilot symbol is a common pilot symbol.

* * * * *